(12) United States Patent
Moon et al.

(10) Patent No.: US 7,064,886 B2
(45) Date of Patent: Jun. 20, 2006

(54) LIGHT REGULATING DEVICE AND PHOTONIC CRYSTAL DISPLAY UTILIZING PHOTONIC BANDGAP CONTROLS

(75) Inventors: Il-kwon Moon, Suwon-si (KR); Suk-han Lee, Yongin-si (KR); Hong-seok Lee, Seongnam-si (KR); Ji-deog Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 206 days.

(21) Appl. No.: 10/626,881

(22) Filed: Jul. 25, 2003

(65) Prior Publication Data

US 2004/0227455 A1 Nov. 18, 2004

(30) Foreign Application Priority Data

Jul. 27, 2002 (KR) ...................... 10-2002-0044432

(51) Int. Cl.
*G02F 1/00* (2006.01)
*G02F 1/03* (2006.01)
*G02F 1/1335* (2006.01)

(52) U.S. Cl. ...................... 359/321; 359/322; 359/252; 349/104; 349/105

(58) Field of Classification Search ............... 359/321, 359/322, 252, 253, 254; 349/104, 105, 193
See application file for complete search history.

(56) References Cited

U.S. PATENT DOCUMENTS 5,281,370 A 1/1994 Asher et al. ................. 264/1.1
5,973,823 A * 10/1999 Koops et al. ................ 359/322
6,940,577 B1 * 9/2005 Kozhukh ..................... 349/156
2001/0028482 A1 10/2001 Nishioka ....................... 359/15
2004/0001246 A1 * 1/2004 Albu et al. .................. 359/321

FOREIGN PATENT DOCUMENTS

JP 2001-142099 5/2001
JP 2003-344831 12/2003
WO WO 00/77566 12/2000

OTHER PUBLICATIONS

Busch et al., "Photonic Band Gap Formation in Certain Self-Organizing System" Sep. 1998, vol. 58, pp. 3896-3908.

(Continued)

*Primary Examiner*—Timothy Thompson
(74) *Attorney, Agent, or Firm*—Lee & Morse, P.C.

(57) ABSTRACT

A light regulating device and photonic crystal display device utilizing bandgap controls including a photonic crystal including a material that is capable of varying its refractive index in accordance with an electric field, the photonic crystal having a photonic bandgap in a specific frequency range; and an upper transparent electrode and a lower transparent electrode arranged on an upper side and a lower side of the photonic crystal, respectively, to which a voltage is applied, wherein a size of the photonic bandgap of the photonic crystal is controlled by the voltage applied between the upper transparent electrode and the lower transparent electrode. With the present invention, a reflection-type or penetration-type display is available which has a simple pixel structure, a high light efficiency, and a high color contrast ratio, the display using high reflection factors depending on color ranges of a photonic crystal.

23 Claims, 6 Drawing Sheets

OTHER PUBLICATIONS

Bartolino et al. Pyroelectric Properties of Polymer Dispersed Ferroelectric Liquid Crystals, Journal of Applied Physics 84(5), 1998, pp. 28-35-2840.

Shimoda, Y., et al., , Applied Physics Letters, vol. 79, No. 22, pp. 3627-3629, (Nov. 26, 2001)  Entitled: "Electric field tuning of a stop band in a reflection spectrum of synthetic opal infiltrated with nematic liquid crystal".

* cited by examiner

LIGHT REGULATING DEVICE AND PHOTONIC CRYSTAL DISPLAY UTILIZING PHOTONIC BANDGAP CONTROLS

BACKGROUND OF THE INVENTION

1. Field of the Invention

The present invention relates to a display device. More particularly, the present invention relates to a light regulating device and photonic crystal display utilizing photonic bandgap controls that adjust refractive index differences among materials constructing photonic crystals to control a photonic bandgap size.

2. Description of the Related Art

A photonic crystal may be characterized as two or more materials having different refractive indices or dielectric constants being arranged in order in a form of a lattice structure. A photonic bandgap is formed in an orderly arrangement of the materials having such different refractive indices. A characteristic of the photonic bandgap is the ability to block electromagnetic waves having particular frequencies or wavelengths from being propagated inside a photonic crystal.

In a case that the photonic bandgap of a photonic crystal is formed in a range of visible light and the frequency or wavelength of light incident on the photonic crystal corresponds to the photonic bandgap, more than 99% of the incident light is theoretically reflected from the photonic crystal. In contrast, most of the incident light having frequencies or wavelengths other than those corresponding to the photonic bandgap penetrate the photonic crystal.

As stated above, the size of a photonic bandgap is primarily determined by differences in refractive indices of materials constructing the photonic crystal. Accordingly, research on controlling a photonic bandgap using such refractive indices of materials is ongoing. However, a display device operating through the control of the photonic bandgap of a photonic crystal has not thus far been developed.

SUMMARY OF THE INVENTION

A feature of an embodiment of the present invention is to provide a light regulating device and photonic crystal display utilizing photonic bandgap controls wherein a pixel structure is simplified and displays that have a high light efficiency and a high color contrast ratio based on use of high reflection factors depending upon color ranges of a photonic crystal are realized.

To provide this feature, an embodiment of the present invention provides a light regulating device including a photonic crystal including a material that is capable of varying its refractive index in accordance with an electric field, the photonic crystal having a photonic bandgap in a specific frequency range; and an upper transparent electrode and a lower transparent electrode arranged on an upper side and a lower side of the photonic crystal, respectively, to which a voltage is applied, wherein a size of the photonic bandgap of the photonic crystal is controlled by the electric voltage applied between the upper transparent electrode and lower transparent electrode.

The light regulating device may further include an upper transparent substrate and a lower transparent substrate having the upper transparent electrode and the lower transparent electrode, respectively, coated thereon, the upper transparent electrode and the lower transparent electrode being capable of applying an electric field to the photonic crystal, wherein the upper transparent substrate and the lower transparent substrate are attached on the upper side and the lower side of the photonic crystal, respectively.

Further, in order to achieve another feature of the present invention, there is provided a photonic crystal display device utilizing bandgap controls, including a plurality of photonic crystals including a material that is capable of varying its refractive index in accordance with an electric field, each of the plurality of photonic crystals having a photonic bandgap in a different frequency range; and a plurality of transparent electrodes formed on opposing sides of each of the plurality of photonic crystals for independently applying a respective predetermined electric field to each of the plurality of photonic crystals, wherein a size of a photonic bandgap of each of the plurality of photonic crystals is controlled by the electric voltage respectively applied to the corresponding one of the plurality of transparent electrodes.

The plurality of photonic crystals may be arranged on a two-dimensional plane. Alternately, the plurality of photonic crystals may be vertically arranged.

A reflection amount of visible light reflected in a specific frequency range from the photonic crystal may be variable based on the electric field applied to the photonic crystal. Similarly, a penetration amount of visible light penetrated in a specific frequency range from the photonic crystal may be variable based on the electric field applied to the photonic crystal.

The photonic crystal display device may further include a plurality of transparent substrates, on which a pattern of the transparent electrodes capable of independently applying the predetermined electric field to each of the plurality of photonic crystals is coated, are attached on sides of each of the plurality of photonic crystals.

The photonic crystal display device may further include a plurality of insulation spacers formed between each of the plurality of photonic crystals to electrically and spatially separate each of the plurality of photonic crystals.

BRIEF DESCRIPTION OF THE DRAWINGS

The above and other features and advantages of the present invention will become more apparent to those of ordinary skill in the art by describing in detail various embodiments thereof with reference to the attached drawings in which.

DETAILED DESCRIPTION OF THE INVENTION

Figure 1:
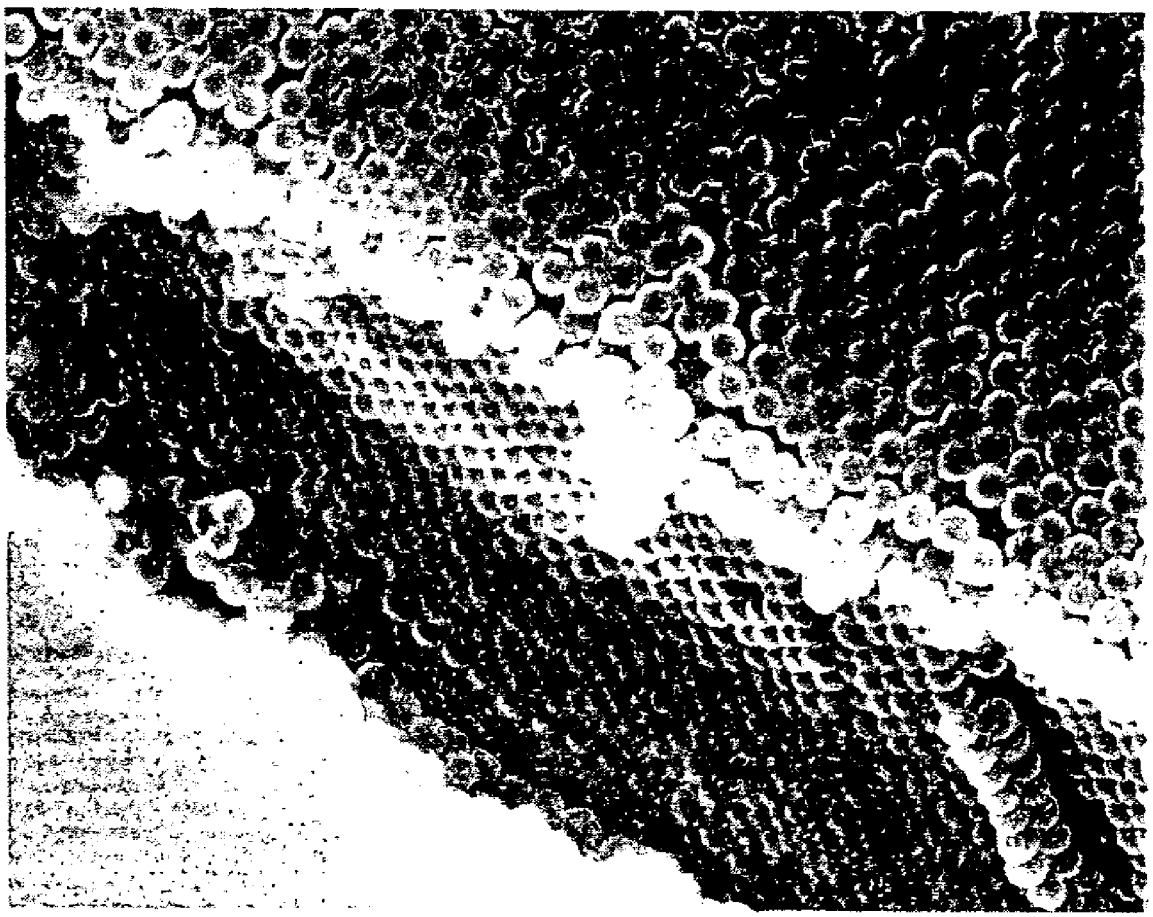
FIG. 1 is scanning electron microscope (SEM) photograph showing an opal-structured photonic crystal formed of stacked polystyrene colloidal particles having a diameter of 200 nm.

Korean Patent Application No. 2002-44432, filed on Jul. 27, 2002, and entitled: "Light Regulating Device and Photonic Crystal Display Utilizing Photonic Bandgap Controls," is incorporated by reference herein in its entirety.

The present invention will now be described more fully hereinafter with reference to the accompanying drawings, in which various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. It will also be understood that when a layer is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. Like numbers refer to like elements throughout.

FIG. 1 is scanning electron microscope (SEM) photograph showing a three-dimensional opal-structured photonic crystal structure formed of polystyrene colloidal particles stacked to a face-centered cubic structure.

Most colloidal particles have diameters ranging from about 100 nm to 500 nm. A diameter of polystyrene colloidal particles used in FIG. 1 is 200 nm and a refraction index thereof is about 1.6.

A photonic bandgap of a photonic crystal is determined by a lattice structure form of the photonic crystal, a unit lattice size, and a difference of the refractive indices of the constituent materials.

A frequency for which a photonic bandgap of a photonic crystal is formed satisfies equation (1):

$$f \sim \frac{c}{2a} \tag{1}$$

wherein 'f' denotes a frequency, 'c' represents the velocity of light in a vacuum, 'a' represents the unit lattice size of a photonic crystal, and '~' represents "is approximately equal to." Further, the size of a photonic bandgap is primarily determined by the refractive index differences among the materials constructing the photonic crystal.

Figure 2:
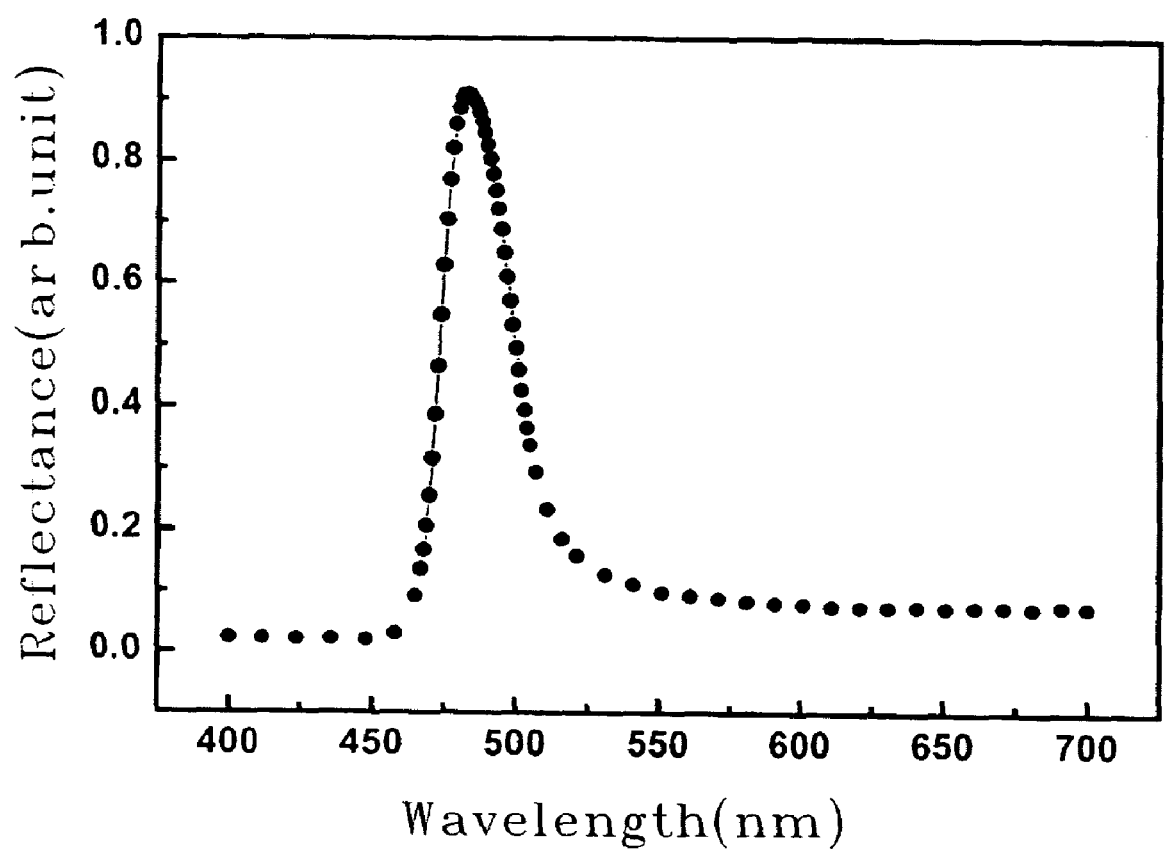
FIG. 2 is a graph illustrating reflection factors depending upon wavelengths of light reflected by a photonic bandgap in the photonic crystal of FIG. 1.

FIG. 2 is a graph illustrating, based on wavelengths of light, reflection factors of light reflected in a specific direction in the photonic bandgap of the photonic crystal of FIG. 1.

Conventionally, a photonic bandgap is formed by filling empty space of an opal-structured photonic crystal, i.e., the space among colloidal particles, with an electro-optic material and regulating a difference of refractive indices of the electro-optic material and the colloidal particles.

A difference of the refractive indices of the electro-optic material and the colloidal particles can be adjusted by applying an electric field from an external source.

More particularly, a photonic bandgap is not formed if an electric field is applied such that a difference of refractive indices of the electro-optic material and the colloidal particles is less than a specific value. However, a photonic bandgap is formed if an electric field is applied such that the difference of the refractive indices of the electro-optic material and the colloidal particles is more than a specific value. At this time, it is well known that the size of a bandgap is proportional to a difference of the refractive indices.

Accordingly, after filling the empty space of a photonic crystal having a photonic bandgap as in FIG. 1 with the electro-optic material, and by regulating the size of a photonic bandgap with an application of an electric field to the photonic crystal, the width of a reflection range shown in FIG. 2 can be adjusted.

Figure 3A:
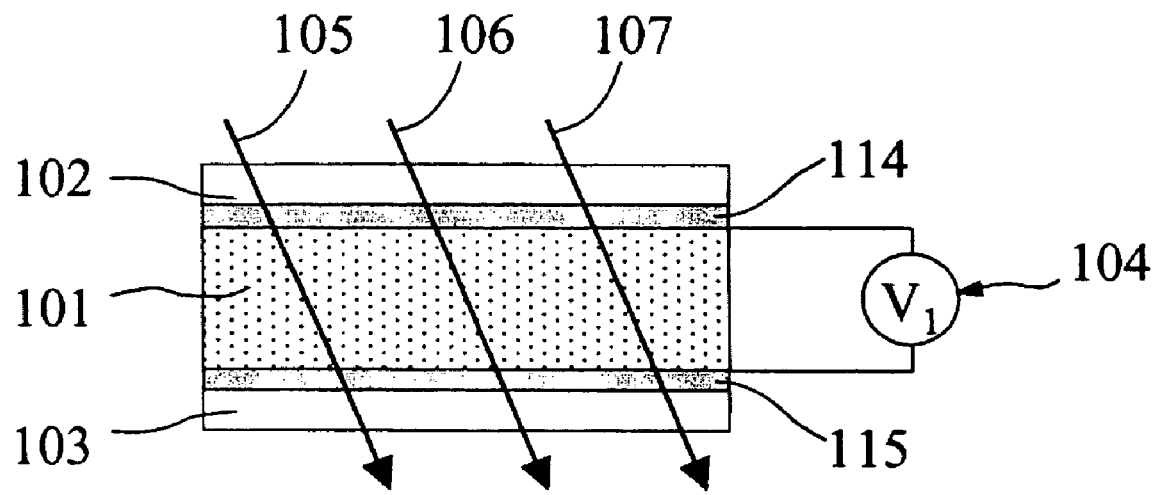
FIGS. 3A to 3C illustrate sectional views showing operations of a light regulating device using bandgap controls according to an embodiment of the present invention.
Figure 3B:
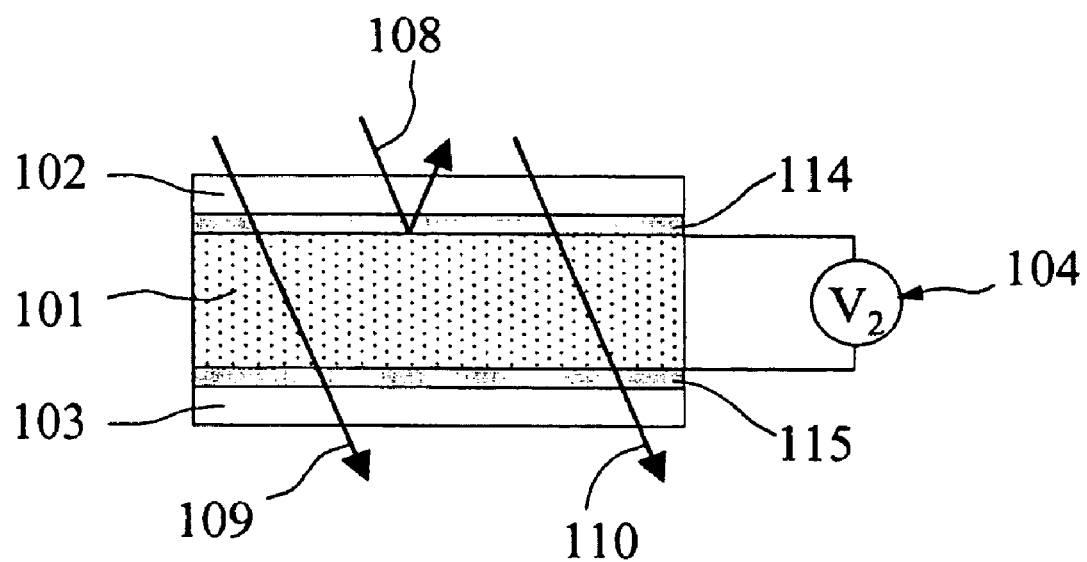
Figure 3C:
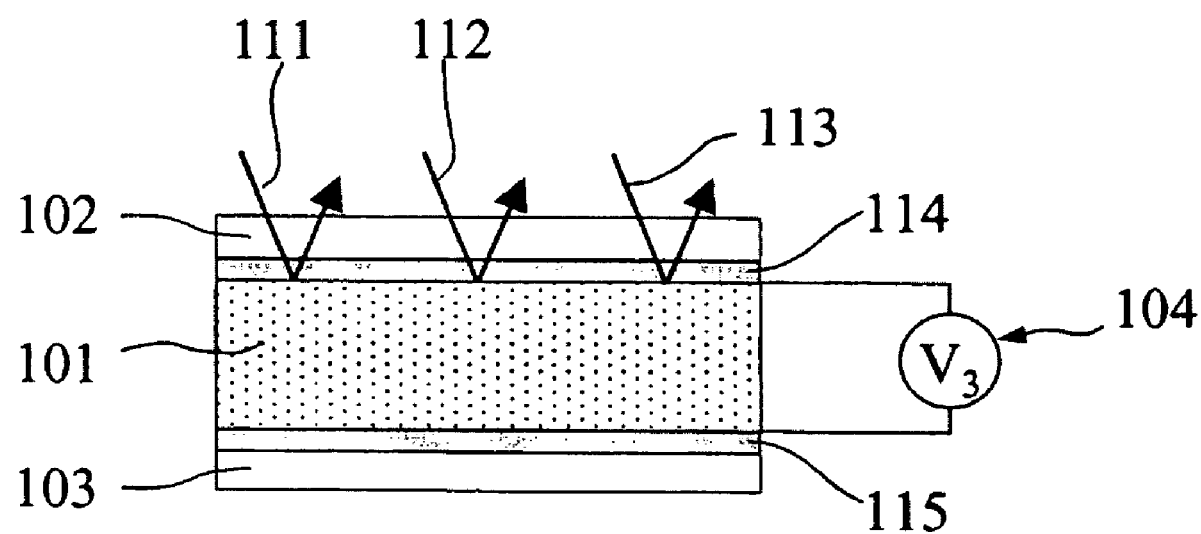

FIGS. 3A to 3C illustrate sectional views showing operations of a light regulating device using bandgap controls according to an embodiment of the present invention.

As shown in FIGS. 3A to 3C, a light regulating device using bandgap controls according to an embodiment of the present invention includes a photonic crystal 101, an upper transparent substrate 102, a lower transparent substrate 103, and a power supply 104 for supplying a voltage to an upper transparent electrode 114 and a lower transparent electrode 115, which are coated on the upper transparent substrate 102 and the lower transparent substrate 103, respectively.

The photonic crystal 101 consists of an electro-optic material, which is capable of varying its refractive index in accordance with an electric field, and one or more materials, for example, polystyrene colloidal particles, which do not vary their refractive indices in accordance with an electric field. Accordingly, the size of a photonic bandgap of the photonic crystal 101 may be controlled by an electric field.

Further, the photonic crystal 101 has a lattice structure form and a unit lattice size that can have a photonic bandgap of a predetermined size of the frequency range $\Delta f$ (i.e., from a predetermined frequency $f_L$ to a predetermined frequency $f_H$, such that $\Delta f = f_H - f_L$).

Here, the photonic crystal 101 can have a photonic bandgap of the size of the frequency range $\Delta f$ by a change of a difference of refractive indices among a material that is capable of varying its refractive index in accordance with an electric field and one or more materials that do not vary their refractive indices in accordance with an electric field.

The upper transparent substrate 102 and the lower transparent substrate 103 are arranged on an upper side and a lower side of the photonic crystal 101, respectively. The upper and lower transparent substrates 102 and 103 are coated with the upper and lower transparent electrodes 114 and 115 so that the upper and lower transparent electrodes 114 and 115 can apply an electric field to the photonic crystal 101. The electric field is formed by a voltage from the power supply 104 applied between the upper and lower transparent electrodes 114 and 115. The size of the photonic bandgap of the photonic crystal 101 is controlled by the voltage applied to the upper transparent electrode 114 and the lower transparent electrode 115.

FIG. 3A illustrates a case where a specific voltage $V_1$ is applied between the upper transparent electrode 114 and the lower transparent electrode 115.

The specific voltage $V_1$ is a voltage applied so that a refractive index difference value $\Delta r_1$ among the material that is capable of varying its refractive index in accordance with an electric field and the other material that is not so capable is less than a specific value for forming a photonic bandgap. That is, the specific voltage $V_1$ is a voltage applied in order for the size of the photonic bandgap to be zero, i.e., $\Delta f(V_1)=0$, so that the photonic crystal 101 does not have a reflection range.

At this time, in a case that visible light having respective frequencies of $f_1$ 105, $f_2$ 106, and $f_3$ 107 are incident on the photonic crystal 101, each of the incident lights penetrate the photonic crystal 101.

FIG. 3B illustrates a case where a specific voltage $V_2$ is applied between the upper transparent electrode 114 and the lower transparent electrode 115. The specific voltage $V_2$ is a voltage applied so that a refractive index difference value $\Delta r_2$ among the material that is capable of varying its refractive index in accordance with an electric field and the other material that is not so capable is larger than a specific value for forming a photonic bandgap. At this time, the size of a specific photonic bandgap $\Delta f(V_2)$ may be expressed as equation (2):

$$\Delta f(V_2) = f_H(V_2) - f_L(V_2) \quad (2)$$

Of the incident lights, light 108 corresponding to a photonic bandgap, that is, light 108 having a frequency $f_2$ and satisfying a condition of $f_2(V_2) < f_2 < f_H(V_2)$ is reflected from the photonic crystal 101. Further, light 109 having a frequency $f_1$ that is smaller than $f_2(V_2)$ and light 110 having a frequency $f_3$ that is larger than $f_H(V_2)$ penetrate the photonic crystal 101.

FIG. 3C illustrates a case where a specific voltage $V_3$ is applied between the upper transparent electrode 114 and the lower transparent electrode 115. The specific voltage $V_3$ is a voltage applied so that a refractive index difference value $\Delta r_3$ among the material that is capable of varying its refractive index in accordance with an electric field and the other materials that is not so capable is larger than a refractive index difference value $\Delta r_2$. At this time, the size of a photonic bandgap $\Delta f(V_3)$ may be expressed as equation (3):

$$\Delta f(V_3) = f_H(V_3) - f_2(V_3) \quad (3)$$

At this time, as each of the respective frequencies $f_1$ 111, $f_2$ 112, and $f_3$ 113 of incident light satisfy a condition that they are larger than $f_L(V_3)$ and smaller than $f_H(V_3)$, each of the incident lights corresponding to a photonic bandgap are reflected from the photonic crystal 101.

Figure 4:
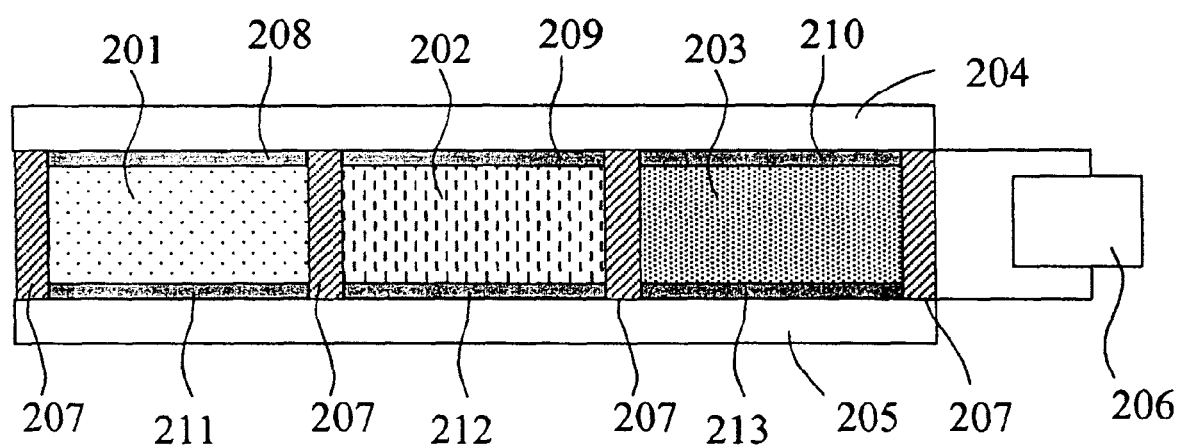
FIG. 4 illustrates a schematic view showing a flat-type unit pixel structure for a reflection-type color photonic crystal display capable of displaying a wide range of colors through a combination of two or more colors according to an embodiment of the present invention.

FIG. 4 illustrates a schematic view of a flat-type unit pixel structure for a reflection-type color photonic crystal display according to an embodiment of the present invention.

Referring to FIG. 4, the reflection-type color photonic crystal display displays a wide range of colors using a combination of two or more colors.

A unit pixel 200 includes a plurality of photonic crystals 201, 202, and 203 (in this embodiment there are an exemplary three photonic crystals illustrated) having different lattice structure forms or unit lattice sizes. The reason the lattice structure forms or unit lattice sizes are different is so that each of the plurality of photonic crystals 201, 202, and 203 will have a photonic bandgap in a frequency range of visible light of a different color.

Further, each of the plurality of photonic crystals 201, 202 and 203 consist of a material that is capable of varying its refractive index in accordance with an electric field and one or more material that does not vary its refractive index in accordance with an electric field.

A first photonic crystal 201 that can have a photonic bandgap at a frequency range $\Delta v_1$ of a first specific color, a second photonic crystal 202 that can have a photonic bandgap at a frequency range $\Delta v_2$ of a second specific color, and a third photonic crystal 203 that can have a photonic bandgap at a frequency range $\Delta v_3$ of a third specific color are arranged on a two-dimensional plane as shown in FIG. 4 to construct one unit pixel 200.

Each of the upper and lower sides of the photonic crystals 201, 202, and 203 are provided with upper and lower transparent substrates 204 and 205, respectively, on which transparent electrodes 208, 209, 210, 211, 212, and 213 are coated. The transparent electrodes 208, 209, 210, 211, 212, and 213 are coated to independently apply predetermined electric fields to the photonic crystals 201, 202, and 203.

Each of the respective electric fields are independently formed by voltages from a power supply 206 applied between the upper and lower transparent electrodes 208 and 211, 209 and 212, and 210 and 213 of the respective photonic crystals 201, 202, and 203.

Insulation spacers 207 are provided for electrically and spatially separating not only the photonic crystals 201, 202, and 203, but also the unit pixels 200.

The photonic crystals 201, 202, and 203 have photonic bandgaps having a size of $\Delta f_1(V_1)$, $\Delta f_2(V_2)$, and $\Delta f_3(V_3)$, respectively, in frequency ranges $\Delta v_1$, $\Delta v_2$, and $\Delta v_3$ of different colors by predetermined voltages $V_1$, $V_2$, and $V_3$ applied to the upper and lower transparent electrodes 208 and 211, 209 and 212, and 210 and 213 of the respective photonic crystals 201, 202, and 203. Further, they may vary from zero at a minimum to $\Delta v_1$, $\Delta v_2$, and $\Delta v_3$ at a maximum, respectively, depending on the magnitudes of respective voltages.

In addition, the colors and brightness of light reflected from the unit pixels 200 can be controlled depending on reflection amounts of lights of different colors reflected from the respective photonic crystals 201, 202, and 203. This is because the reflection amounts of lights reflected from the photonic crystals 201, 202, and 203 are determined based on the sizes of the respective photonic bandgaps.

Figure 5:
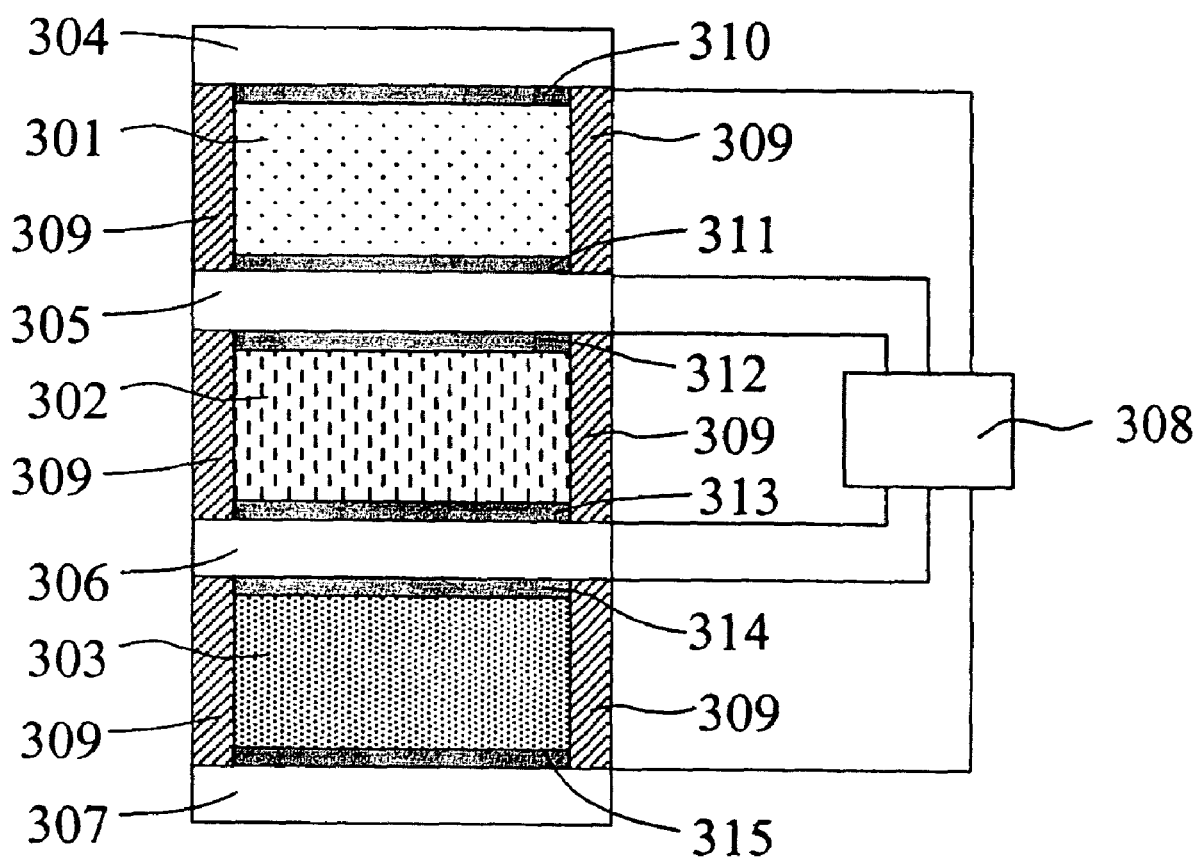
FIG. 5 illustrates a schematic view showing a vertical stack-type pixel structure for reflection-type and penetration-type color photonic crystal display devices according to another embodiment of the present invention.

FIG. 5 illustrates a schematic view of a vertical stack-type pixel structure for reflection-type and penetration-type color photonic crystal display devices according to another embodiment of the present invention.

A unit pixel 300 includes a plurality of photonic crystals 301, 302, and 303 (in this embodiment there are an exemplary three photonic crystals illustrated), each having a different lattice structure form or unit lattice size to have a photonic bandgap in visible light frequency ranges of a different color.

All the photonic crystals 301, 302, and 303 consist of a material that is capable of varying its refractive index in accordance with an electric field and one or more material that does not vary its refractive indices in accordance with an electric field.

A first photonic crystal 301 that can have a photonic bandgap at a frequency range $\Delta v_1$ of a first specific color, a second photonic crystal 302 that can have a photonic bandgap at a frequency range $\Delta v_2$ of a second specific color, and a third photonic crystal 303 that can have a photonic bandgap at a frequency range $\Delta v_3$ of a third specific color are vertically stacked as shown in FIG. 5 to construct one unit pixel 300.

Transparent substrates 304, 305, 306, and 307, on which transparent electrodes 310, 311 and 312, 313 and 314, and 315 are respectively coated, are provided on an upper side and a lower side of the photonic crystals 301, 302, and 303. The transparent electrodes 310, 311, 312, 313, 314, and 315 are coated on the transparent substrates to independently apply predetermined electric fields to the photonic crystals 301, 302, and 303. The respective electric fields are independently formed by a voltage from a power supply 308 applied between the upper and lower transparent electrodes 310 and 311, 312 and 313, 314 and 315 of the respective photonic crystals 301, 302, and 303.

In a case that unit pixels are arranged on a two-dimensional plane, the photonic crystals 301, 302, and 303 constructing each unit pixel are electrically and spatially separated by insulation spacers 309.

The photonic crystals 301, 302, and 303 have photonic bandgaps having a size of $\Delta f_1(V_1)$, $\Delta f_2(V_2)$, and $\Delta f_3(V_3)$, respectively, in frequency ranges $\Delta v_1$, $\Delta v_2$, and $\Delta v_3$ of different colors by predetermined voltages $V_1$, $V_2$, and $V_3$ applied to the upper and lower transparent electrodes 310 and 311, 312 and 313, and 314 and 315 of the respective photonic crystals 301, 302, and 303. Further, they may vary from zero at a minimum to $\Delta v_1$, $\Delta v_2$, and $\Delta v_3$ at a maximum, respectively, depending on the magnitudes of respective voltages.

The colors and brightness of lights reflected from the unit pixels 300 can be controlled depending on reflection amounts of lights of different colors reflected from the respective photonic crystals 301, 302, and 303.

More particularly, the reflection amounts of lights reflected from each of the respective photonic crystals 301, 302, and 303 is determined based on the size of the respective photonic bandgap.

Further, the colors and brightness of lights penetrating unit pixels are controlled by the penetration amounts of lights of different colors penetrated from the respective photonic crystals 301, 302, and 303. More particularly, the penetration amounts of lights of different colors penetrating the respective photonic crystals 301, 302, and 303 are determined by frequency ranges $\Delta v_1 - \Delta f_1(V_1)$, $\Delta v_2 - \Delta f_2(V_2)$, and $\Delta v_3 - \Delta f_3(V_3)$, respectively.

With the light regulating device and photonic crystal display utilizing bandgap controls according to an embodiment of the present invention, displays, which have a high light efficiency and a high color contrast ratio, are available that use high reflection factors depending on color ranges of photonic crystals.

Displays having a wide visual angle are available since a reflection amount or a penetration amount of a specific color can be controlled regardless of an incident direction or a polarized direction of incident light when a three-dimensional photonic crystal is used.

A repetitive structure of as many as five layers may be necessary to have a photonic bandgap. However, since a thickness of a single layer is a few hundred nanometers, the size of a unit pixel may be as small as a few micrometers.

Further, as a unit pixel structure becomes simplified, and as power consumption decreases due to the use of external light, the pixels may be made thinner and lighter. Moreover, outdoor visibility improves since the stronger the external light, the stronger the reflection light and the penetration light.

Various embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A light regulating device comprising:
a photonic crystal including a material that is capable of varying its refractive index in accordance with an electric field, the photonic crystal having a photonic bandgap in a specific frequency range; and
an upper transparent electrode and a lower transparent electrode arranged on an upper side and a lower side of the photonic crystal, respectively, to which a voltage is applied, wherein the upper transparent electrode is at an optical input surface of the photonic crystal,
wherein a size of the photonic bandgap of the photonic crystal is controlled by the voltage applied between the upper transparent electrode and the lower transparent electrode.

2. The light regulating device as claimed in claim 1, wherein a reflection amount of visible light reflected in a specific frequency range from the photonic crystal is variable based on an electric field applied to the photonic crystal.

3. The light regulating device as claimed in claim 1, wherein a penetration amount of visible light penetrated in a specific frequency range from the photonic crystal is variable based on an electric field applied to the photonic crystal.

4. The light regulating device as claimed in claim 1, further comprising:
an upper transparent substrate and a lower transparent substrate having the upper and lower transparent electrodes, respectively, coated thereon, the upper transparent substrate and the lower transparent substrate being capable of applying an electric field to the photonic crystal, wherein the upper transparent substrate and the lower transparent substrate are attached on the upper side and the lower side of the photonic crystal, respectively.

5. A photonic crystal display device utilizing bandgap controls, comprising:
a plurality of photonic crystals including a material that is capable of varying its refractive index in accordance with an electric field, each of the plurality of photonic crystals having a photonic bandgap in a different frequency range; and
a plurality of transparent electrodes formed on opposing sides of each of the plurality of photonic crystals for independently applying a respective predetermined electric field to each of the plurality of photonic crystals,
wherein a size of a photonic bandgap of each of the plurality of photonic crystals is controlled by the electric voltage respectively applied to the corresponding one of the plurality of transparent electrodes.

6. The photonic crystal display device as claimed in claim 5, wherein the plurality of photonic crystals are arranged on a two-dimensional plane.

7. The photonic crystal display device as claimed in claim 5, wherein the plurality of photonic crystals are vertically arranged.

8. The photonic crystal display device as claimed in claim 5, wherein a reflection amount of visible light respectively reflected in a specific frequency range from each of the plurality of photonic crystals is variable based on the electric field applied to that one of the plurality of photonic crystals.

9. The photonic crystal display device as claimed in claim 5, wherein a penetration amount of visible light respectively penetrated in a specific frequency range from each of the plurality of photonic crystals is variable based on the electric field applied to each one of the plurality of photonic crystals.

10. The photonic crystal display device as claimed in claim 5, further comprising:
a plurality of transparent substrates on which a pattern of the transparent electrodes capable of independently applying the predetermined electric field to each of the plurality of photonic crystals is coated are attached on sides of each of the plurality of photonic crystals.

11. The photonic crystal display device as claimed in claim 5, further comprising:
   a plurality of insulation spacers formed between each of the plurality of photonic crystals to electrically and spatially separate each of the plurality of photonic crystals.

12. The photonic crystal display device as claimed in claim 5, wherein at least one of the plurality of the transparent electrodes is interposed between a corresponding photonic crystal and a viewing surface of the photonic crystal display device.

13. The photonic crystal display device as claimed in claim 5, wherein a transparent electrode is interposed between each of the plurality of photonic crystals and a viewing surface of a photonic crystal display device.

14. The photonic crystal display device as claimed in claim 5, wherein one transparent electrode for each of the plurality of photonic crystals is at an optical input surface of a corresponding photonic crystal.

15. The photonic crystal display device as claimed in claim 5, further comprising insulating spacers between adjacent photonic crystals.

16. The photonic crystal display device as claimed in claim 5, wherein each of the plurality of photonic crystals has a unique pair of opposing transparent electrodes.

17. A method of forming a light regulating device, comprising:
   forming a first transparent electrode on an optical input surface of a photonic crystal; and
   forming a second transparent electrode on a surface of the photonic crystal, opposite the optical input surface.

18. The method as claimed in claim 17, further comprising connecting a power supply to the first and second transparent electrodes.

19. The method as claimed in claim 17, further comprising:
   providing a third transparent electrode on an input surface of another photonic crystal; and
   providing a fourth transparent electrode on a surface of the another photonic crystal, opposite the input surface.

20. The method as claimed in claim 19, wherein the photonic crystal and the another photonic crystal are arranged horizontally.

21. The method as claimed in claim 19, wherein the photonic crystal and the another photonic crystal are arranged vertically.

22. The method as claimed in claim 19, further comprising:
   electrically insulating the photonic crystal and the another photonic crystal from one another.

23. The method as claimed in claim 19, wherein at least two of the first, second, third and fourth transparent electrodes are individual electrodes.

* * * * *